US012254852B2

(12) United States Patent
Ji et al.

(10) Patent No.: US 12,254,852 B2
(45) Date of Patent: Mar. 18, 2025

(54) DISPLAY CONTROLLING METHOD, IN-VEHICLE DISPLAY DEVICE, AND COMPUTER-READABLE STORAGE MEDIUM

(71) Applicant: HKC CORPORATION LIMITED, Shenzhen (CN)

(72) Inventors: Guofei Ji, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/088,606

(22) Filed: Dec. 25, 2022

(65) Prior Publication Data

US 2023/0377535 A1 Nov. 23, 2023

(30) Foreign Application Priority Data

May 23, 2022 (CN) ......................... 202210566756.7

(51) Int. Cl.
*G09G 5/10* (2006.01)

(52) U.S. Cl.
CPC ......... *G09G 5/10* (2013.01); *G09G 2300/026* (2013.01); *G09G 2320/0233* (2013.01); *G09G 2320/028* (2013.01); *G09G 2320/0626* (2013.01); *G09G 2320/0686* (2013.01); *G09G 2360/16* (2013.01); *G09G 2380/10* (2013.01)

(58) Field of Classification Search
None
See application file for complete search history.

(56) References Cited

U.S. PATENT DOCUMENTS 10,809,801 B1 * 10/2020 Weng .................... G06F 3/1423
2015/0286457 A1 10/2015 Kim et al.
2016/0355133 A1 * 12/2016 Kim .................... G06F 3/04883
(Continued)

FOREIGN PATENT DOCUMENTS

CN 1922893 A 2/2007
CN 106251822 A 12/2016
(Continued)

OTHER PUBLICATIONS

Wen Wen, Splicing display method and device, apparatus and splicing display system, terminal equipment and display unit; Sep. 29, 2020; Espacenet translation of CN111724693A.*
(Continued)

*Primary Examiner* — Amr A Awad
*Assistant Examiner* — Donna V Bocar

(57) ABSTRACT

A display controlling method, an in-vehicle display device, and a non-transitory computer-readable medium are provided in the present disclosure. The display controlling method is applied to the in-vehicle display device. The in-vehicle display device includes at least two display modules arranged in sequence along a first direction. The method includes controlling each user front-view display module to display with a first brightness; determining a second brightness corresponding to each user side-view display module based on a viewing angle corresponding to each user side-view display module, the second brightness being greater than the first brightness; and controlling each user side-view display module to display with a corresponding second brightness.

18 Claims, 5 Drawing Sheets

(56) References Cited

U.S. PATENT DOCUMENTS

| | | | | |
|---|---|---|---|---|
| 2021/0354559 | A1* | 11/2021 | Kim | B60R 16/023 |
| 2023/0150439 | A1* | 5/2023 | Chen | G02F 1/1396 296/24.34 |

FOREIGN PATENT DOCUMENTS

| | | | |
|---|---|---|---|
| CN | 107358929 | A | 11/2017 |
| CN | 108400132 | A | 8/2018 |
| CN | 111724693 | A | 9/2020 |
| CN | 113362751 | A | 9/2021 |
| CN | 113380171 | A | 9/2021 |
| JP | 2021138342 | A | 9/2021 |

OTHER PUBLICATIONS

Chinese First Office Action, Application No. 202210566756.7, mailed Mar. 2, 2023( 15 pages).
Notification to Grant Patent Right for Invention, Chinese Application No. 202210566756.7, mailed May 2, 2023 (7 pages).

* cited by examiner

DISPLAY CONTROLLING METHOD, IN-VEHICLE DISPLAY DEVICE, AND COMPUTER-READABLE STORAGE MEDIUM

CROSS REFERENCE TO RELATED APPLICATIONS

The present disclosure claims priority of Chinese Patent Application No. 202210566756.7, filed on May 23, 2022 in China National Intellectual Property Administration, the entire contents of which are hereby incorporated by reference in their entireties.

TECHNICAL FIELD

The present disclosure relates to the field of displaying technologies, and in particular to a display controlling method, an in-vehicle display device, and a computer-readable storage medium.

BACKGROUND

With the development of the modern era and the improvement of user needs, the current in-vehicle display device is usually required to be designed for a large display, in order to build a beautiful and intelligent in-vehicle display device (e.g., an in-vehicle center control display).

When the display screen of the in-vehicle display device is large, if a flat screen is applied to prepare the display screen of the in-vehicle display device, the brightness perceived by users at each point of the display screen of the in-vehicle display device may not be consistent, which makes the display effect of the in-vehicle display device poor.

To avoid the above technical problem, the display screen of the in-vehicle display device is conventionally prepared by adopting a flexible screen and a flexible substrate, such that both sides of the display screen can be bent toward the user, thereby enabling the user to perceive a more consistent brightness at each point of the display screen. However, the cost of the flexible screen is relatively high, making the cost of the in-vehicle display device also higher.

SUMMARY OF THE DISCLOSURE

A technical problem which the present disclosure aims to solve is how to improve the display effect of the in-vehicle display device with a low cost.

According to a first aspect of the present disclosure, a display controlling method is provided and applied to an in-vehicle display device. The in-vehicle display device includes at least two display modules arranged in sequence along a first direction, and the at least two display modules comprise at least one user front-view display module and at least one user side-view display module. The method includes controlling the user front-view display module to display with a first brightness; determining a second brightness corresponding to each user side-view display module based on a viewing angle corresponding to each user side-view display module, the second brightness being greater than the first brightness; and controlling each user side-view display module to display with a corresponding second brightness. A distance between a user position and one of the at least one user front-view display module in a normal direction of the one of the at least one user front-view display module is a preset distance, and the viewing angle is formed by a second direction and a normal direction of a corresponding display module, the second direction being from a point on the corresponding display module toward the user position.

According to a second aspect of the present disclosure, an in-vehicle device is provided and includes a processor, a memory, and at least two display modules arranged in sequence along a first direction. The memory is configured to store program instructions, and the processor is configured to execute the program instructions to implement the above method According to a fourth aspect of the present disclosure, a non-transitory computer-readable storage medium is provided and stores program instructions. An in-vehicle display device comprises at least two display modules arranged in sequence along a first direction, the at least two display modules comprise at least one user front-view display module and at least one user side-view display module. The program instructions are executed by a processor to implement the above display controlling method.

BRIEF DESCRIPTION OF THE DRAWINGS

In order to more clearly illustrate the technical solutions in the embodiments of the present disclosure, drawings for describing the embodiments will be described in brief in the following. Apparently, the drawings in the following show only some of the embodiments of the present disclosure, and other drawings may be obtained by any ordinary skilled person in the art based on these drawings without any creative work.

DETAILED DESCRIPTION

Technical solutions of the embodiments of the present disclosure will be clearly and completely described below by referring to the accompanying drawings in the embodiments of the present disclosure. Obviously, the described embodiments show only some of, but not all of, the embodiments of the present disclosure. All other embodiments obtained by any ordinary skilled person in the art based on the embodiments in the present disclosure without making creative work shall fall within the scope of the present disclosure.

Terms "first" and "second" in the present disclosure are used for descriptive purposes only, and shall not be interpreted as indicating or implying relative importance or implicitly specifying the number of the described technical features. In descriptions for the present disclosure, "multiple" or "plurality of" may indicate at least two, such as two, three, or the like, unless otherwise specific limitations are made. In addition, terms "includes", "has", and any variations thereof, are intended to cover non-exclusive inclusion. For example, a process, a method, a system, a product or an apparatus including a series of operations or units is not limited to the listed operations or units, but may further include operations or units that are not listed, or other operations or units that are inherent to the process, the method, the product, or the apparatus.

Figure 1:
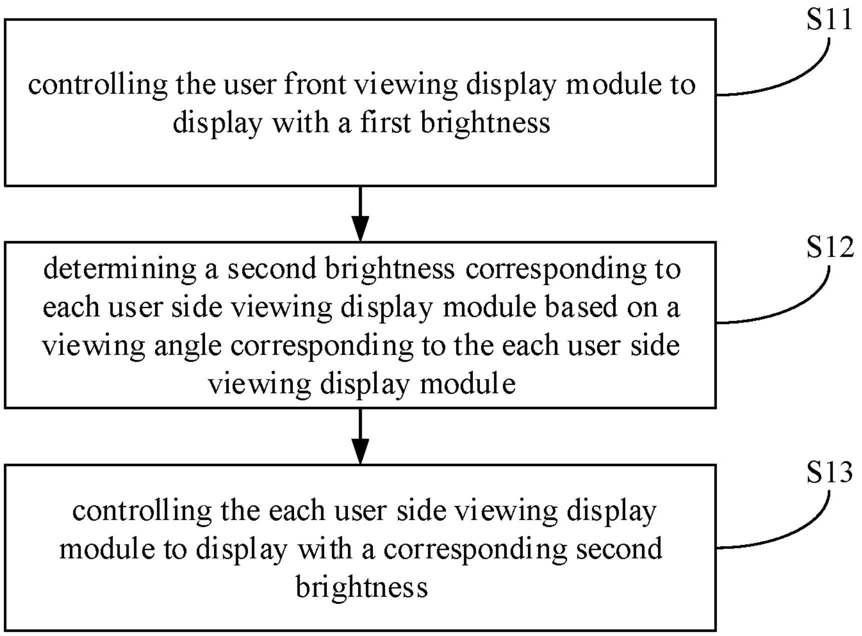
FIG. 1 is a flow chart of a display controlling method according to an embodiment of the present disclosure.
Figure 2:
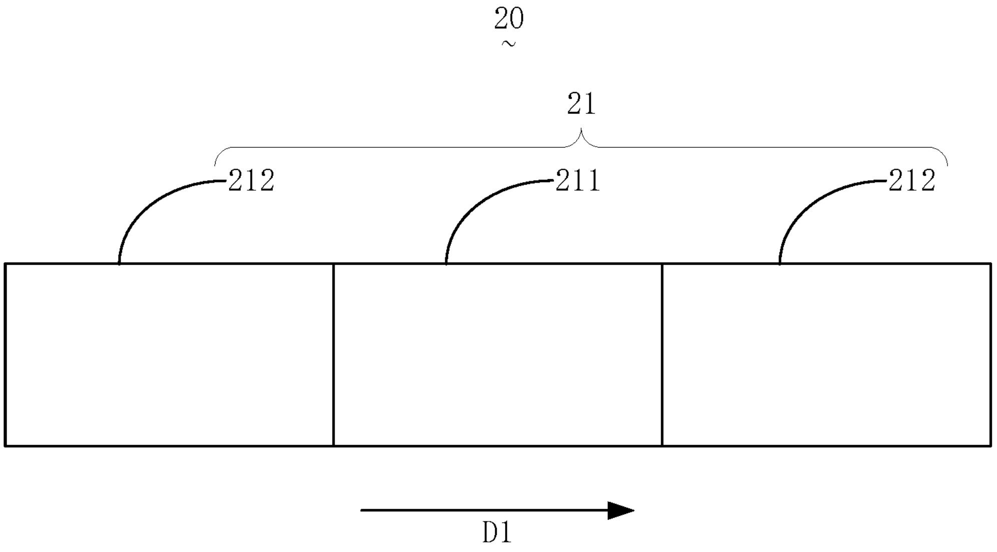
FIG. 2 is a schematic front view of an in-vehicle display device according to a first embodiment of the present disclosure.
Figure 3:
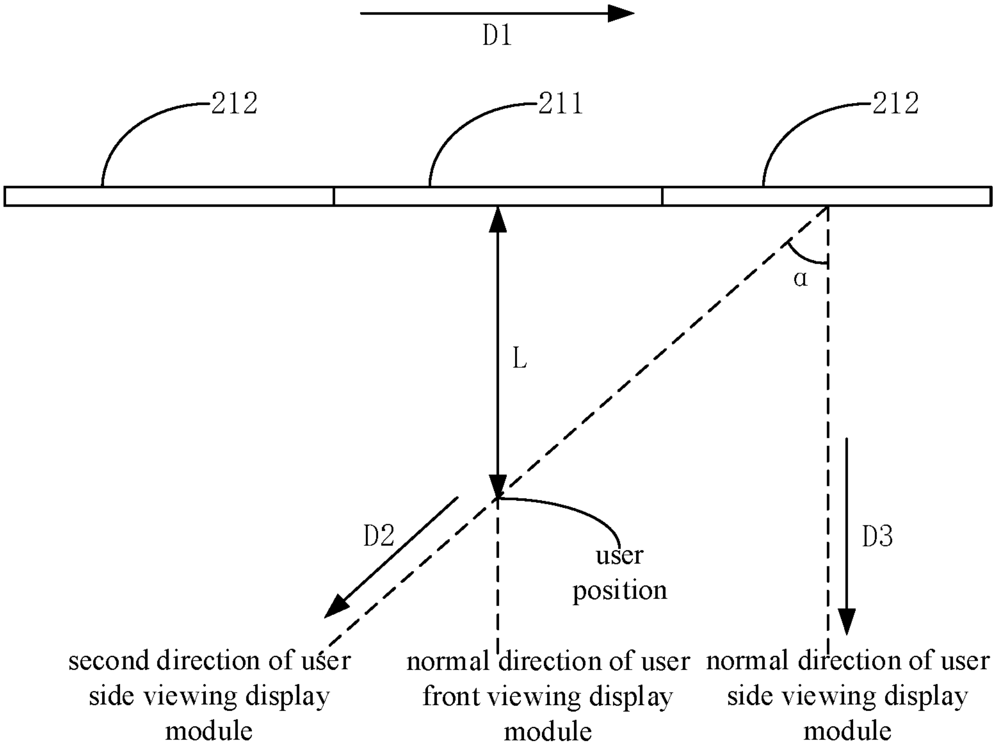
FIG. 3 is a schematic top view of the in-vehicle display device according to an embodiment of the present disclosure.

A display controlling method is provided in the present disclosure. As shown in FIG. 1, FIG. 2 and FIG. 3. FIG. 1 is a flow chart of a display controlling method according to an embodiment of the present disclosure; FIG. 2 is a schematic front view of an in-vehicle display device according to a first embodiment of the present disclosure; and FIG. 3 is a schematic top view of the in-vehicle display device according to an embodiment of the present disclosure. The display controlling method is applied to an in-vehicle device 20.

As shown in FIG. 2, the in-vehicle display device 20 may include at least two display modules 21, and the at least two display modules 21 may be arranged in sequence along a first direction D1.

In some embodiments, the in-vehicle display device 20 may be an in-vehicle central control displayer configured to display vehicle status information such as a vehicle speed, an opening-closing state of a vehicle door, and an oil amount, or may be a displayer in the vehicle configured for a user other than a driver to watch a video, or may be a display device in the vehicle having other functions, which is not limited herein.

The number of the at least two display modules 21 may be any one of two, or three as shown in FIG. 3, ten, or other numbers, which may be determined based on an actual need and is not limited herein. When specifically arranging the at least two display modules 21, a combining display module may be obtained through splicing adjacent display modules. The combining display module may perform a screen display based on all display modules. In some embodiments, the adjacent display modules may be arranged with a preset separating distance from each other. A specific arrangement may be made based on the actual need, and is not limited herein. The at least two display modules 21 may include at least one user front-view display module 211 and at least one user side-view display module 212.

As shown in FIG. 1, the display controlling method may include operations S11-S13.

In an operation S11, the method may include controlling each user front-view display module to display with a first brightness.

The user front-view display module may be one of the at least two display modules 21.

As shown in FIG. 2 and FIG. 3, the at least two display modules 21 may include the user front-view display module 211 and user side-view display modules 212.

In the at least two display modules 21, at least one display module facing towards the user may be each regarded as the user front-view display module 211, and all display module other than the user front-view module(s) 211 may be regarded as the user side-view display module 212. That is, the display module which cannot be directly viewed by the user in the at least two display modules 21 may be regarded as the user side-view display module 212.

The brightness of the front-view display module 211 may be adjusted to the first brightness for displaying. In practice, the first brightness may be a preset proportion of a maximum brightness of the display modules in the at least two display modules 21. For example, the first brightness may be 30%, 50%, or 70% of the maximum brightness.

In an operation S12, the method may include determining a second brightness corresponding to each user side-view display module based on a viewing angle corresponding to each user side-view display module.

In some embodiments, the second brightness may be greater than the first brightness. The user side-view display module 212 may be the display module other than the user front-view display module 211. A distance between a user position and one of the at least one user front-view display module in a normal direction of the one of the at least one user front-view display module is a preset distance, and the viewing angle is formed by a second direction and a normal direction of a corresponding display module, the second direction being from a point on the corresponding display module toward the user position.

As shown in FIG. 3, $\alpha$ may be the viewing angle corresponding to the user side-view display module 212. That is, $\alpha$ may be the angle between a normal direction D3 of the user side-view display module 212 and the second direction D2 of the user side-view display module 212.

Taking FIG. 3 as an example, a first user side-view display module 212 is arranged on a left side of the user front-view display module 211, and a second user side-view display module 212 is arranged on a right side of the user front-view display module 211. When a viewing angle corresponding to the first user side-view display module 212 is a first angle, a viewing angle corresponding to the second user side-view display module 212 is a second angle. The first angle has an opposite positive-negative sign relative to the second angle. In this way, the second brightness corresponding to each user side-view display module 212 may be determined based on an absolute value of the viewing angle corresponding to each user side-view display module 212.

In an operation S13, the method may include controlling each user side-view display module to display with a corresponding second brightness.

After determining the second brightness corresponding to each user side-view display module 212, a brightness of each user side-view display module 212 may be adjusted to the corresponding second brightness for displaying. Each second brightness may be greater than the first brightness. The second brightness corresponding to the user side-view display modules 212 at different positions may be different.

It should be noted that the above operations S11-S13 are simply an example. In practice, an operation sequence may be adaptively adjusted in combination with a logical relationship between the operations. For example, the operation sequence may be S12-S13-S11 or S12-S11-S13, which is not limited herein.

Specifically, the at least one user front-view module display module 211 may be at least two display modules arranged adjacent to each other. The at least two display modules 21 may be at least two display modules whose corresponding normal directions are parallel to each other.

Different from the prior art, according to the technical solution of the present disclosure, based on determining the user front-view module display module, the viewing angle corresponding to each user side-view display module may be determined based on a relationship between each user side-view display module and the user front-view display module and a relationship between each user side-view display module and the user position. When the at least two display modules are controlled or operated to display, the second brightness corresponding to each user side-view display module may be determined based on each viewing angle. All the second brightness may be greater than the first brightness of the user front-view display module. The user front-view display module may be controlled to display with the first brightness, and the user side-view display module may be controlled to display with the corresponding second brightness. That is, although a distance between the user side-view display module and the user position is greater than a distance between the user front-view display module and the user position, the user side-view display module may be controlled to display with the second brightness greater than the first brightness of the user front-view display module. In this way, a difference between a brightness of the user front-view display module and a brightness of the user side-view display module perceived by the user may be reduced or eliminated, such that a display brightness consistency of the in-vehicle display device using a flat screen may be improved, and a display effect of the in-vehicle display device may be improved with a low cost.

In an embodiment, the operation S12 may specifically include acquiring the viewing angle corresponding to each user side-view display module.

Determining a visual brightness corresponding to each user side-view display module based on a corresponding viewing angle and a relationship curve between the visual brightness and the viewing angle, and taking the visual brightness as the second brightness corresponding to each user side-view display modules. The relationship curve between the visual brightness and the viewing angle is determined based on a haze degree of a diffuser plate of the corresponding display module.

Figure 4:
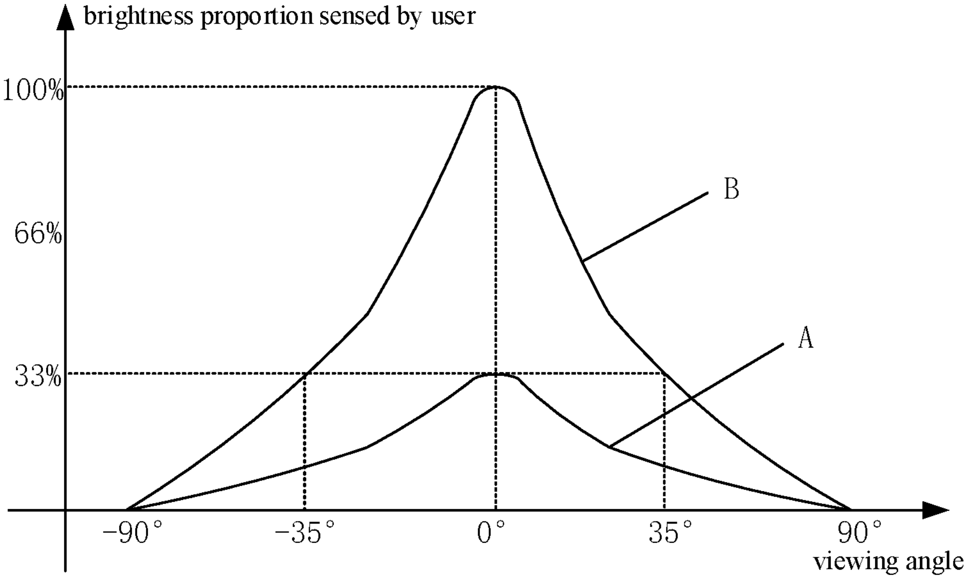
FIG. 4 is a curve diagram showing a relationship between a brightness proportion perceived by a user and a viewing angle according to an embodiment of the present disclosure.

Specifically, as shown in FIG. 4, FIG. 4 is a curve diagram showing a relationship between a brightness proportion perceived by a user and a viewing angle according to an embodiment of the present disclosure. A curve B may be a relationship curve corresponding to the user side-view display module 212, and a curve A may be a relationship curve corresponding to the user front-view display module 211.

When the maximum brightness of the user front-view display module 211 is the same with the maximum brightness of the user side-view display module 212, the brightness proportion perceived by the user described above may indicate the visual brightness. Specifically, the brightness proportion perceived by the user multiplied by the maximum brightness of the display modules may be the visual brightness perceived by the user in a corresponding viewing angle. The relationship curve between the visual brightness and the viewing angle as mentioned above may be the relationship between the brightness proportion and the viewing angle as shown in FIG. 4.

In the curve A, when the viewing angle is 0°, the brightness proportion perceived by the user may be 33%. It can be seen that the first brightness of the user front-view display module 211 may be 33% of the maximum brightness thereof.

In the curve B, when the viewing angle is 0°, the brightness proportion perceived by the user may be 100%. It can be seen that the second brightness of a user side-view display module 212 may be 100% of the maximum brightness thereof. When the viewing angle is 35° or −35°, the brightness of the user side-view display module 212 perceived by the user is 33% of the maximum brightness thereof.

In conclusion, based on relationship curves between the brightness proportion and the viewing angle shown in FIG. 4, when at the user position, the viewing angle corresponding to the user side-view display module 212 is 35° or −35°, while the viewing angle corresponding to the user front-view display module 211 is 0°, the second brightness of the user side-view display module 212 may be determined as 33% of the maximum brightness thereof, and the first brightness of the user front-view display module 211 may be determined as 33% of the maximum brightness thereof. In this way, the brightness of the user side-view display module 212 perceived by the user at the user position is the same with the brightness of the user front-view display module 211 perceived by the user at the user position, such that the display effect of the in-vehicle display device may be improved.

Figure 5:
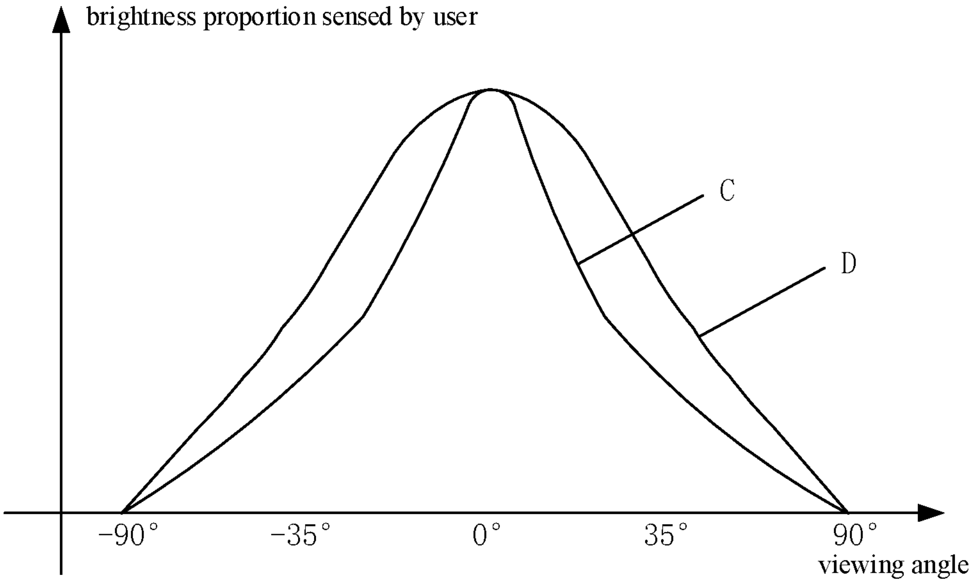
FIG. 5 is a curve diagram showing the relationship between the brightness proportion perceived by the user and the viewing angle according to another embodiment of the present disclosure.

FIG. 5 is a curve diagram showing the relationship between the brightness proportion perceived by the user and the viewing angle according to another embodiment of the present disclosure. In practice, as shown in FIG. 5, a curve C and a curve D are two different relationship curves between the brightness proportion perceived by the user and the viewing angle in the same display module under a case where haze degrees of a diffuser plate are different. It can be seen from the FIG. 5 that for the same display module, even if the brightness proportions perceived by the user are the same when the viewing angle is 0°, relationship curves (such as the curve C and the curve D) between the brightness proportion perceived by the user and the viewing angle may be different in response to the haze degrees of the diffuser plate being different.

Therefore, in practice, a detailed process of determining the curve A and the curve B may be as follows.

The brightness proportion perceived by the user when the viewing angle corresponding to the user front-view display module 211 is 0° may be determined, and the curve A may be determined based on a haze degree corresponding to the user front-view display module 211 and the brightness proportion perceived by the user when the viewing angle corresponding to the user front-view display module 211 is 0°.

The brightness proportion perceived by the user at the viewing angle corresponding to the user front-view display module 211 may be set to be the brightness proportion perceived by the user at the viewing angle corresponding to the user side-view display module 212. The curve B may be determined based on a haze degree corresponding to the user side-view display module 212 and the brightness proportion perceived by the user at the viewing angle corresponding to the user side-view display module 212. The brightness proportion perceived by the user when the viewing angle corresponding to the user side-view display module 212 is 0° may be determined based on the curve B.

The curve A and the curve B may be determined as described above, such that the relationship curve between the brightness proportion perceived by the user and the viewing angle corresponding to the user front-view display module 211, and the relationship curve between the brightness proportion perceived by the user and the viewing angle corresponding to the user side-view display module 212 may be determined. In this way, the first brightness of the user front-view display module 211 may be determined based on the brightness proportion perceived by the user corresponding to the curve A when the viewing angle is 0° and the maximum brightness corresponding to the display modules. The second brightness of the user side-view display module 212 may be determined based on the maximum brightness corresponding to the display modules and the brightness proportion perceived by the user corresponding to the curve B at a corresponding viewing angle when the viewing angle corresponding to the user front-view display module 211 is 0°. In this way, the first brightness and the second brightness are obtained to be displayed with.

Based on the above manner, the curve B corresponding to each user side-view display module 212 may be constructed based on the curve A corresponding to the user front-view display module 211, and the second brightness corresponding to each user side-view display module 212 may be determined for displaying.

In an embodiment, the operation S12 may specifically include determining the second brightness corresponding to each user side-view display module based on the viewing angle corresponding to each user side-view display module and a principle that the greater the absolute value of the viewing angle, the greater a corresponding second brightness.

Specifically, it can be seen from the curves shown in FIG. 4 that, for the same display module, when the brightness remains unchanged, the greater the absolute value of the viewing angle, the less the brightness displayed by the display module which is perceived by the user. Therefore, the second brightness corresponding to each user side-view display module 212 may be determined based on the principle that the greater the absolute value of the viewing angle, the greater the corresponding second brightness, such that the brightness of the user side-view display module 212 of which viewing angle is not 0° may be improved. In this way, the brightness of the user side-view display module 212 of which viewing angle is not 0° perceived by the user may be the same with the brightness of the user front-view display module 211 of which the viewing angle is 0° perceived by the user, such that the brightness of each region of a whole display screen provided by the at least two display modules 21 may be consistent. In addition, a uniform display brightness may be realized without the need of adopting a flexible screen, that is, the display effect of the in-vehicle display device may be improved with the low cost.

In an embodiment, the at least two display modules may be arranged in sequence along the first direction on at least two rows to form a display module array.

Figure 6:
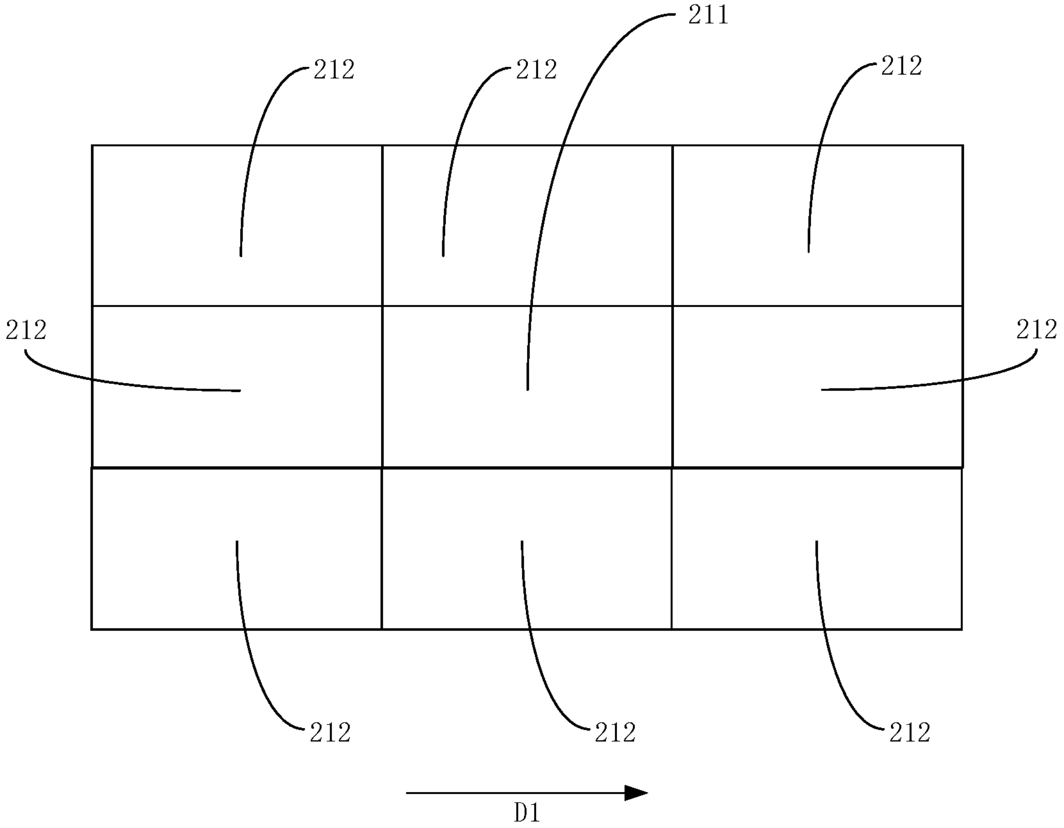
FIG. 6 is a schematic front view of the in-vehicle display device according to a second embodiment of the present disclosure.

Specifically, as shown in FIG. 6, FIG. 6 is a schematic front view of the in-vehicle display device according to a second embodiment of the present disclosure. The at least two display modules 21 are arranged in sequence along the first direction D1 on three rows, and a 3*3 display module array is obtained. The number of the rows of the display module array may be other numbers. The number of the display modules on each row may be three, five, or the like, which may be determined based on the actual need and is not limited herein.

Based on the above manner, the display screen having any area and including any number of display modules may be constructed to meet a diversified requirement and improve an applicability of the in-vehicle display device.

In an embodiment, the at least one user side-view display module may include a first side-view display module and a second side-view display module. A width of the first side-view display module is less than a width of the second side-view display module along the first direction, a first offset distance of the first side-view display module is less than a second offset distance of the second side-view display module, and the first offset distance is a distance between the first side-view display module and one of the at least one the user front-view display module and the second offset distance is a distance between the second side-view display module and the one of the at least one user front-view display module.

Specifically, the first side-view display module and the second side-view display module may be any two user side-view display modules satisfying a preset condition among all the user side-view display module 212. In some embodiments, the preset condition may be that the width of the first side-view display module is less than the width of the second side-view display module along the first direction, and the first offset distance of the first side-view display module is less than the second offset distance of the second side-view display module.

Figure 7:
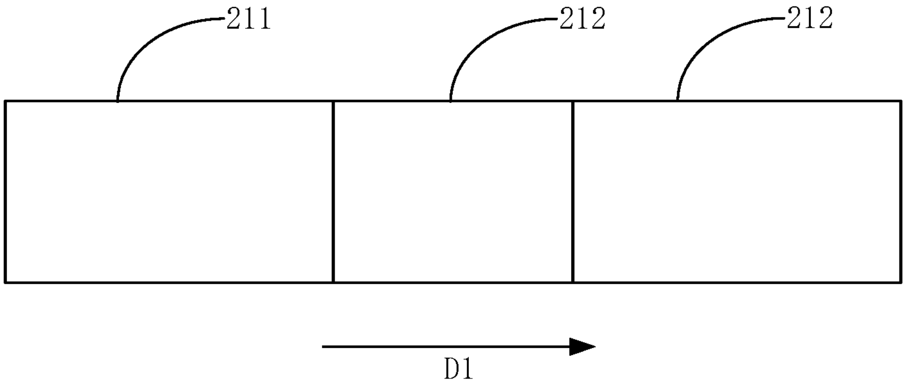
FIG. 7 is a schematic front view of the in-vehicle display device according to a third embodiment of the present disclosure.

As shown in FIG. 7, FIG. 7 is a schematic front view of the in-vehicle display device according to a third embodiment of the present disclosure. The user side-view display module 212 adjacent to the user front-view display module 211 may be the first side-view module, and the user side-view display module 212 spaced from the user front-view display module 211 with a display module may be the second side-view display module.

It can be seen from FIGS. 4-5 that a slope of the curve of the brightness proportion perceived by the user may be increased with a decrease of the absolute value of the viewing angle. Therefore, a change in the brightness proportion perceived by the user caused by an increase of an offset distance when the viewing angle is less (that is, when a distance between the user and the user front-view display module 211 is closer) may be greater than a change in the brightness proportion perceived by the user caused by an increase of the offset distance when the viewing angle is greater (that is, when the distance between the user and the user front-view display module 211 is farther).

Based on the above manner, the width of the display module closer to the user front-view display module 211 in the first direction D1 may be less, and the width of the display module farther from the user front-view display module 211 in the first direction D1 may be greater, such that a brightness difference between adjacent ones in multiple display modules closer to the user front-view display module 211 perceived by the user may be less. In this way, a brightness transition among the display modules closer to the user front-view display module 211 perceived by the user may be smoother, so as to further improve the display effect of the in-vehicle display device.

In some embodiments, the at least two display modules may be arranged in sequence along the first direction on at least two rows to form a display module array.

In each user side-view display module locating in a different row from the user front-view module, the width of the first side-view display module is less than the width of the second side-view display module along the first direction, a first horizontal offset distance of the first side-view display module is less than a second horizontal offset distance of the second side-view display module, and the first horizontal offset distance is a horizontal distance between the first side-view display module and one of the at least one the user front-view display module and the second offset distance is a horizontal distance between the second side-view display module and the one of the at least one user front-view display module.

Figure 8:
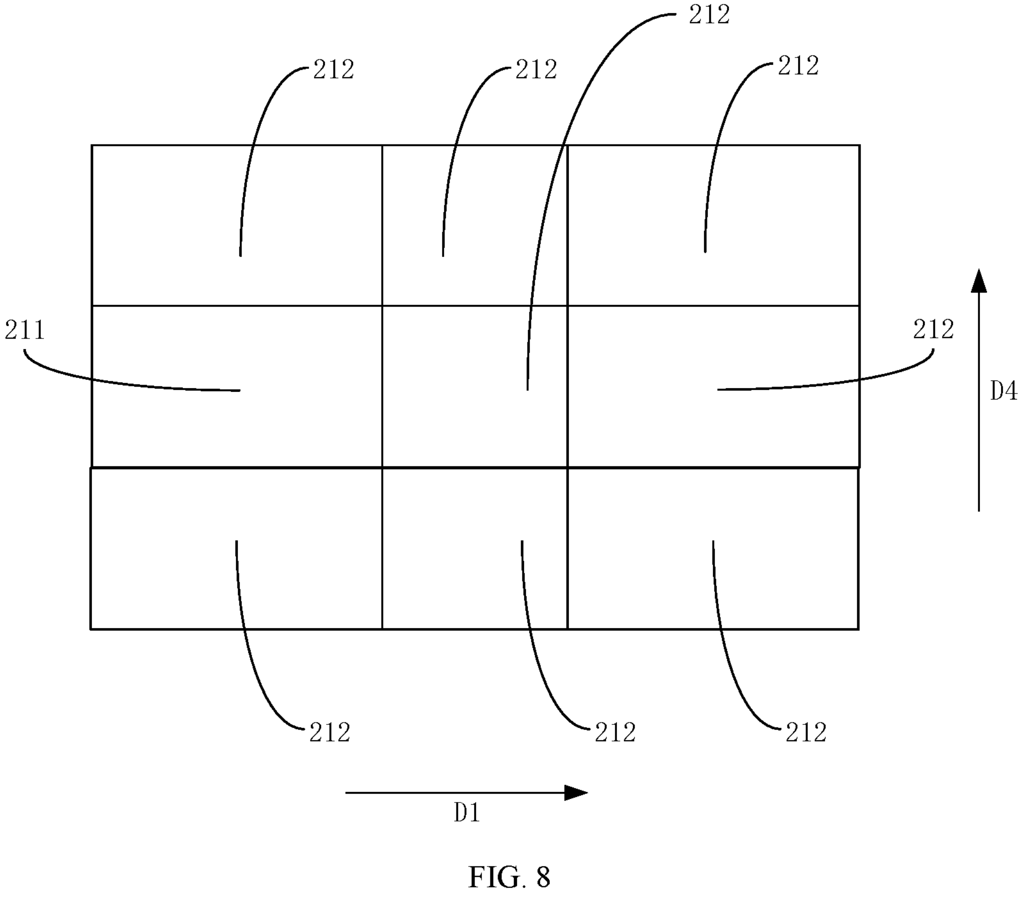
FIG. 8 is a schematic front view of the in-vehicle display device according to a fourth embodiment of the present disclosure.

Specifically, as shown in FIG. 8, FIG. 8 is a schematic front view of the in-vehicle display device according to a fourth embodiment of the present disclosure. The at least two display modules 21 are arranged in sequence along the first direction D1 on the three rows, and the 3*3 display module array may be obtained.

The first side-view display module and the second side-view display module may be any two user side-view display modules satisfying a preset condition and being not located on the same row with the user front-view display module 211 among all the user side-view display module 212. In some embodiments, the preset condition may be that the width of the first side-view display module is less than the width of the second side-view display module along the first direction, and the first horizontal offset distance of the first side-view display module is less than the second horizontal offset distance of the second side-view display module.

Based on the above manner, the width of the display module closer to the user front-view display module 211 in the first direction D1 may be less, and the width of the display module farther from the user front-view display module 211 in the first direction D1 may be greater, such that the brightness difference between adjacent ones in multiple display modules closer to the user front-view display module 211 perceived by the user may be less. In this way, the brightness transition among the display modules closer to the user front-view display module 211 perceived by the user may be smoother, so as to further improve the display effect of the in-vehicle display device.

In some embodiments, a width of the user front-view display module along the first direction is greater than a horizontal width threshold, and/or a width of the user front-view display module along a third direction is greater than a vertical width threshold.

As shown in FIG. 8, the third direction D4 is substantially perpendicular to the first direction D1, and substantially parallel to a display surface of one of the at least one user front-view display module 211.

Based on the above manner, a minimum value of the width of the user front-view display module 211 along the direction D1 and a minimum value of the width of the user front-view display module 211 along the third direction D4 may be limited, such that an area of the user front-view display module 211 may be equal to or greater than a preset area. The area of the user front-view display module 211 is configured to be large enough, such that a total number required for the at least two display modules 21 may be reduced and a difficulty of assembling the at least two display modules 21 may be reduced. In this way, the cost of the in-vehicle display device may be reduced while not reducing the display effect of the in-vehicle display device as much as possible.

Figure 9:
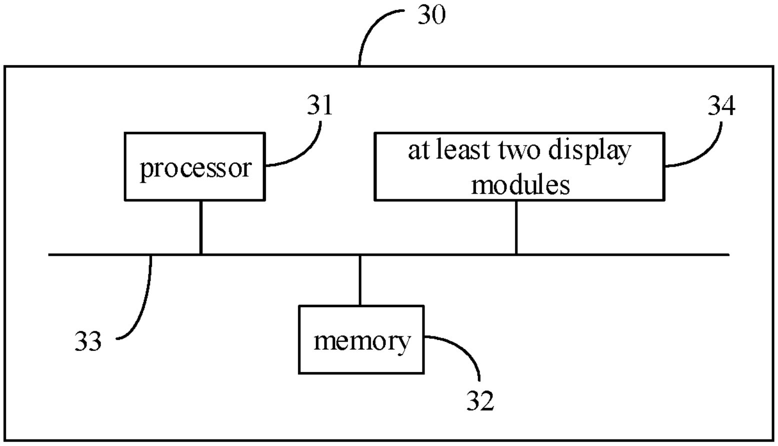
FIG. 9 is structural schematic view of the in-vehicle display device according to an embodiment of the present disclosure.

An in-vehicle display device is provided in the present disclosure. As shown in FIG. 9. FIG. 9 is structural schematic view of the in-vehicle display device according to an embodiment of the present disclosure. The in-vehicle display device 30 may include a processor 31, a memory 32, a bus 33, and at least two display modules 34, arranged in sequence along the first direction.

The processor 31, the memory 32, and at least two display modules 34 are connected to the bus 33. The memory 32 may be configured to store program instructions. The processor 31 may execute the program instructions to implement the display controlling method in the above embodiments.

In the present embodiment, the processor 31 may also be referred to as a central processing unit (CPU). The processor 31 may be an integrated circuit chip with a capability of processing a signal. The processor 31 may also be a general-purpose processor, a digital signal processor (DSP), an application specific integrated circuit (ASIC), a field programmable gate array (FPGA) or other programmable logic devices, discrete gate or transistor logic devices, discrete hardware components. The general-purpose processor may be a microprocessor, or the processor 31 may be any conventional processor or the like.

Different from the prior art, according to the technical solution of the present disclosure, based on determining the user front-view module display module, the viewing angle corresponding to each user side-view display module may be determined based on the relationship between each user side-view display module and the user front-view display module and the relationship between each user side-view display module and the user position. When the at least two display modules are controlled or operated to display, the second brightness corresponding to each user side-view display module may be determined based on each viewing angle. All the second brightness may be greater than the first brightness of the user front-view display module. The user front-view display module may be controlled to display with the first brightness, and the user side-view display module may be controlled to display with the corresponding second brightness. That is, although the distance between the user side-view display module and the user position is greater than the distance between the user front-view display module and the user position, the user side-view display module may be controlled to display with the second brightness greater than the first brightness of the user front-view display module. In this way, the difference between the brightness of the user front-view display module and the brightness of the user side-view display module perceived by the user may be reduced or eliminated, such that the display brightness consistency of the in-vehicle display device using the flat screen may be improved, and the display effect of the in-vehicle display device may be improved with the low cost.

Figure 10:
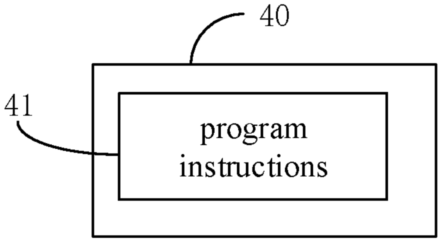
FIG. 10 is structural schematic view of a non-transitory computer-readable storage medium according to an embodiment of the present disclosure.

A non-transitory computer-readable storage medium is provided in the present disclosure, as shown in FIG. 10. FIG. 10 is structural schematic view of a non-transitory computer-readable storage medium according to an embodiment of the present disclosure. The non-transitory computer-readable storage medium 40 may store program instructions 41. When the program instructions 41 are executed by a processor (not shown), the display controlling method in the above embodiments may be implemented.

The non-transitory computer-readable storage medium 40 in the present embodiment may be but is not limited to, a U disk, an SD card, a PD optical drive, a mobile hard disk, a large-capacity floppy drive, a flash memory, a multimedia memory card, a server, a storage unit in an FPGA or in an ASIC, or the like.

Different from the prior art, according to the technical solution of the present disclosure, based on determining the user front-view module display module, the viewing angle corresponding to each user side-view display module may be determined based on the relationship between each user side-view display module and the user front-view display module and the relationship between each user side-view display module and the user position. When the at least two display modules are controlled or operated to display, the second brightness corresponding to each user side-view display module may be determined based on each viewing angle. All the second brightness may be greater than the first brightness of the user front-view display module. The user front-view display module may be controlled to display with the first brightness, and the user side-view display module may be controlled to display with the corresponding second brightness. That is, although the distance between the user side-view display module and the user position is greater than the distance between the user front-view display module and the user position, the user side-view display module may be controlled to display with the second brightness greater than the first brightness of the user front-view display module. In this way, the difference between the brightness of the user front-view display module and the brightness of the user side-view display module perceived by the user may be reduced or eliminated, such that the display brightness consistency of the in-vehicle display device using the flat screen may be improved, and the display effect of the in-vehicle display device may be improved with the low cost.

Figure 11:
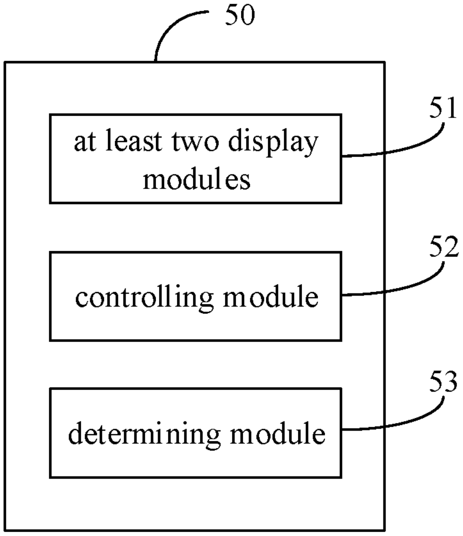
FIG. 11 is structural schematic view of the in-vehicle display device according to another embodiment of the present disclosure.

An in-vehicle display device is provided in the present disclosure, as shown in FIG. 11. FIG. 11 is structural schematic view of the in-vehicle display device according to another embodiment of the present disclosure. The in-vehicle display device 50 may include at least two display modules 51, and a controlling module 52 and a determination module 53.

The at least two display modules 51 may be arranged in sequence along the first direction, and include at least one user front-view display module and at least one user side-view display module.

The controlling module 52 is configured to control each user front-view display module to display with a first brightness.

The determining module 53 is configured to determine a second brightness corresponding to each user side-view display module based on a corresponding viewing angle to each user side-view display module. The second brightness is greater than the first brightness.

The controlling module 52 is also configured to control each user side-view display module to display with a corresponding second brightness.

A distance between a user position and one of the at least one user front-view display module in a normal direction of the one of the at least one user front-view display module is a preset distance, and the viewing angle is formed by a second direction and a normal direction of a corresponding display module, the second direction being from a point on the corresponding display module toward the user position.

In some embodiments, the at least one user side-view display module may include a first side-view display module and a second side-view display module. A width of the first side-view display module is less than a width of the second side-view display module along the first direction, a first offset distance of the first side-view display module is less than a second offset distance of the second side-view display module, and the first offset distance is a distance between the first side-view display module and one of the at least one the user front-view display module and the second offset distance is a distance between the second side-view display module and the one of the at least one user front-view display module.

In some embodiments, the at least two display modules are arranged in sequence along the first direction on at least two rows to form a display module array. In each user side-view display module locating in a different row from the user front-view module, the width of the first side-view display module is less than the width of the second side-view display module along the first direction, a first horizontal offset distance of the first side-view display module is less than a second horizontal offset distance of the second side-view display module, and the first horizontal offset distance is a horizontal distance between the first side-view display module and one of the at least one the user front-view display module and the second offset distance is a horizontal distance between the second side-view display module and the one of the at least one user front-view display module.

In some embodiments, a width of the user front-view display module along the first direction is greater than a horizontal width threshold.

In some embodiments, the determining module 53 may be configured to acquire the viewing angle corresponding to each user side-view display module; and determine a visual brightness corresponding to each user side-view display module based on a corresponding viewing angle and a relationship curve between the visual brightness and the viewing angle, and taking the visual brightness as the second brightness corresponding to each user side-view display modules. The relationship curve between the visual brightness and the viewing angle is determined based on a haze degree of a diffuser plate of the corresponding display module.

In some embodiments, the determining module 53 may be configured to acquire the viewing angle corresponding to each user side-view display module; and determine the second brightness corresponding to each user side-view display module based on the viewing angle corresponding to each user side-view display module and a principle that the greater an absolute value of the viewing angle, the greater a corresponding second brightness.

In some embodiments, the at least two display modules may be arranged in sequence along the first direction on at least two rows to form a display module array.

Different from the prior art, according to the technical solution of the present disclosure, based on determining the user front-view module display module, the viewing angle corresponding to each user side-view display module may be determined based on the relationship between each user side-view display module and the user front-view display module and the relationship between each user side-view display module and the user position. When the at least two display modules are controlled or operated to display, the second brightness corresponding to each user side-view display module may be determined based on each viewing angle. All the second brightness may be greater than the first brightness of the user front-view display module. The user front-view display module may be controlled to display with the first brightness, and the user side-view display module may be controlled to display with the corresponding second brightness. That is, although the distance between the user side-view display module and the user position is greater than the distance between the user front-view display module and the user position, the user side-view display module may be controlled to display with the second brightness greater than the first brightness of the user front-view display module. In this way, the difference between the brightness of the user front-view display module and the brightness of the user side-view display module perceived by the user may be reduced or eliminated, such that the display brightness consistency of the in-vehicle display device using the flat screen may be improved, and the display effect of the in-vehicle display device may be improved with the low cost.

The above description shows only an implementation of the present disclosure, and does not limit the scope of the present disclosure. Any equivalent structure or equivalent process transformation performed based on the specification and the accompanying drawings of the present disclosure, directly or indirectly applied in other related technical fields, shall be equally included in the scope of the present disclosure.

What is claimed is:

1. A display controlling method, applied to an in-vehicle display device, wherein the in-vehicle display device comprises a plurality of display modules arranged in sequence along a first direction, and the plurality of display modules comprise a user front-view display module and a plurality of user side-view display modules;

wherein the method comprises:

controlling the user front-view display module to display with a first brightness;

determining a second brightness corresponding to each of the plurality of user side-view display modules based on a viewing angle corresponding to the each of the plurality of user side-view display modules, wherein the second brightness is greater than the first brightness; and controlling each of the plurality of user side-view display modules to display with a corresponding second brightness;

wherein a distance between a user position and the user front-view display module in a normal direction of the user front-view display module is a preset distance, and the viewing angle is formed by a second direction and a normal direction of a corresponding display module, the second direction being from a point on the corresponding display module toward the user position;

wherein the plurality of user side-view display modules comprise adjacent three user side-view display modules which are denoted as a first side-view display module, a second side-view display module, and a third side-view display module; the first side-view display module, the second side-view display module, and the third side-view display module are disposed on a same side of the user front-view display module along the first direction;

a width of the first side-view display module along the first direction is W1, a width of the second side-view display module along the first direction is W2, and a width of the third side-view display module along the first direction is W3; a first offset distance of the first side-view display module is L1, a second offset distance of the second side-view display module is L2, and a third offset distance of the third side-view display module is L3; the first offset distance is a distance between the first side-view display module and the user front-view display module, the second offset distance is a distance between the second side-view display module and the user front-view display module, and the third offset distance is a distance between the third side-view display module and the user front-view display module; W1<W2<W3, and L1<L2<L3.

2. The display controlling method according to claim 1, wherein the determining a second brightness corresponding to each of the plurality of user side-view display modules based on a viewing angle corresponding to the each of the plurality of user side-view display modules comprises:

acquiring the viewing angle corresponding to each of the plurality of user side-view display modules; and determining a visual brightness corresponding to each of the plurality of user side-view display modules based on a corresponding viewing angle and a relationship curve between the visual brightness and the viewing angle; and taking the visual brightness as the second brightness corresponding to each of the plurality of user side-view display modules; wherein the relationship curve between the visual brightness and the viewing angle is determined based on a haze degree of a diffuser plate of the corresponding display module.

3. The display controlling method according to claim 2, wherein the visual brightness is indicated by a brightness proportion perceived by a user, and a production between the brightness proportion perceived by the user and the maximum brightness of the display modules is the visual brightness perceived by the user in a corresponding viewing angle.

4. The display controlling method according to claim 1, wherein the determining a second brightness corresponding to each of the plurality of user side-view display modules based on a viewing angle corresponding to the each of the plurality of user side-view display modules comprises:

acquiring the viewing angle corresponding to each of the plurality of user side-view display modules; and determining the second brightness corresponding to each of the plurality of user side-view display modules based on the viewing angle corresponding to each of the plurality of user side-view display modules and a principle that the greater an absolute value of the viewing angle, the greater a corresponding second brightness.

5. The display controlling method according to claim 1, wherein the plurality of display modules are arranged in sequence along the first direction on at least two rows to form a display module array.

6. The display controlling method according to claim 1, wherein at least one display module facing towards a user in the plurality of display modules is the user front-view display module, and all display modules other than the user front-view module in the plurality of display modules are the user side-view display module.

7. The display controlling method according to claim 1, wherein the plurality of display modules are arranged in sequence along the first direction on at least two rows to form a display module array; in each of the plurality of user side-view display modules located in a different row from the user front-view module, the width of the first side-view display module is less than the width of the second side-view display module along the first direction, a first horizontal offset distance of the first side-view display module is less than a second horizontal offset distance of the second side-view display module, and the first horizontal offset distance is a horizontal distance between the first side-view display module and the user front-view display module and the second offset distance is a horizontal distance between the second side-view display module and the user front-view display module.

8. The display controlling method according to claim 7, wherein a width of the user front-view display module along the first direction is greater than a horizontal width threshold.

9. The display controlling method according to claim 7, wherein a width of the user front-view display module along a third direction is greater than a vertical width threshold, and the third direction is substantially perpendicular to the first direction and substantially parallel to a display surface of the user front-view display module.

10. An in-vehicle display device, comprising:

a memory, configured to store program instructions;

a processor; and a plurality of display modules, arranged in sequence along a first direction;

wherein the plurality of display modules comprise a user front-view display module and a plurality of user side-view display modules, and the processor is configured to execute the program instructions to implement controlling the user front-view display module to display with a first brightness;

determining a second brightness corresponding to each of the plurality of user side-view display modules based on a viewing angle corresponding to the each of the plurality of user side-view display modules, wherein the second brightness is greater than the first brightness; and controlling each of the plurality of user side-view display modules to display with a corresponding second brightness;

wherein a distance between a user position and the user front-view display module in a normal direction of the user front-view display module is a preset distance, and the viewing angle is formed by a second direction and a normal direction of a corresponding display module, the second direction being from a point on the corresponding display module toward the user position;

wherein the plurality of user side-view display modules comprise adjacent three user side-view display modules which are denoted as a first side-view display module, a second side-view display module, and a third side-view display module; the first side-view display module, the second side-view display module, and the third side-view display module are disposed on a same side of the user front-view display module along the first direction;

a width of the first side-view display module along the first direction is $W1$, a width of the second side-view display module along the first direction is $W2$, and a width of the third side-view display module along the first direction is $W3$; a first offset distance of the first side-view display module is $L1$, a second offset distance of the second side-view display module is $L2$, and a third offset distance of the third side-view display module is $L3$; the first offset distance is a distance between the first side-view display module and the user front-view display module, the second offset distance is a distance between the second side-view display module and the user front-view display module, and the third offset distance is a distance between the third side-view display module and the user front-view display module; $W1<W2<W3$, and $L1<L2<L3$.

11. The in-vehicle display device according to claim 10, wherein the processor is further configured to implement:

acquiring the viewing angle corresponding to each of the plurality of user side-view display modules; and determining a visual brightness corresponding to each of the plurality of user side-view display modules based on a corresponding viewing angle and a relationship curve between the visual brightness and the viewing angle; and taking the visual brightness as the second brightness corresponding to each of the plurality of user side-view display modules; wherein the relationship curve between the visual brightness and the viewing angle is determined based on a haze degree of a diffuser plate of the corresponding display module.

12. The in-vehicle display device according to claim 10, wherein the processor is further configured to implement:

acquiring the viewing angle corresponding to each of the plurality of user side-view display modules; and determining the second brightness corresponding to each of the plurality of user side-view display modules based on the viewing angle corresponding to each of the plurality of user side-view display modules and a principle that the greater an absolute value of the viewing angle, the greater a corresponding second brightness.

13. The in-vehicle display device according to claim 10, wherein the plurality of display modules are arranged in sequence along the first direction on at least two rows to form a display module array.

14. The in-vehicle display device according to claim 10, wherein the plurality of display modules are arranged in sequence along the first direction on at least two rows to form a display module array; in each of the plurality of user side-view display modules located in a different row from the user front-view module, the width of the first sideview display module is less than the width of the second side-view display module along the first direction, a first horizontal offset distance of the first side-view display module is less than a second horizontal offset distance of the second side-view display module, and the first horizontal offset distance is a horizontal distance between the first side-view display module and the user front-view display module and the second offset distance is a horizontal distance between the second side-view display module and the user front-view display module.

15. The in-vehicle display device according to claim 14, wherein a width of the user front-view display module along the first direction is greater than a horizontal width threshold.

16. The in-vehicle display device according to claim 14, wherein a width of the user front-view display module along a third direction is greater than a vertical width threshold, and the third direction is substantially perpendicular to the first direction and substantially parallel to a display surface of the user front-view display module.

17. The in-vehicle display device according to claim 10, wherein a display module facing towards a user in the plurality of display modules is the user front-view display module, and all display module other than the user front-view module in the plurality of display modules is the user side-view display module.

18. A non-transitory computer-readable storage medium, applied to an in-vehicle display device and storing program instructions, wherein the in-vehicle display device comprises a plurality of display modules arranged in sequence along a first direction, the plurality of display modules comprise a user front-view display module and a plurality of user side-view display modules; the program instructions are capable of being executed by a processor to implement:

controlling the user front-view display module to display with a first brightness;

determining a second brightness corresponding to each of the plurality of user side-view display modules based on a viewing angle corresponding to the each of the plurality of user side-view display modules, wherein the second brightness is greater than the first brightness; and controlling each of the plurality of user side-view display modules to display with a corresponding second brightness;

wherein a distance between a user position and the user front-view display module in a normal direction of the user front-view display module is a preset distance, and the viewing angle is formed by a second direction and a normal direction of a corresponding display module, the second direction being from a point on the corresponding display module toward the user position;

wherein the plurality of user side-view display modules comprise adjacent three user side-view display modules which are denoted as a first side-view display module, a second side-view display module, and a third side-view display module; the first side-view display module, the second side-view display module, and the third side-view display module are disposed on a same side of the user front-view display module along the first direction;

a width of the first side-view display module along the first direction is W1, a width of the second side-view display module along the first direction is W2, and a width of the third side-view display module along the first direction is W3; a first offset distance of the first side-view display module is L1, a second offset distance of the second side-view display module is L2, and a third offset distance of the third side-view display module is L3; the first offset distance is a distance between the first side-view display module and the user front-view display module, the second offset distance is a distance between the second side-view display module and the user front-view display module, and the third offset distance is a distance between the third side-view display module and the user front-view display module; $W1<W2<W3$, and $L1<L2<L3$.

* * * * *